May 3, 1927.
L. A. OSGOOD
1,626,961
PORTABLE SCALE
Filed March 16, 1920
2 Sheets-Sheet 1
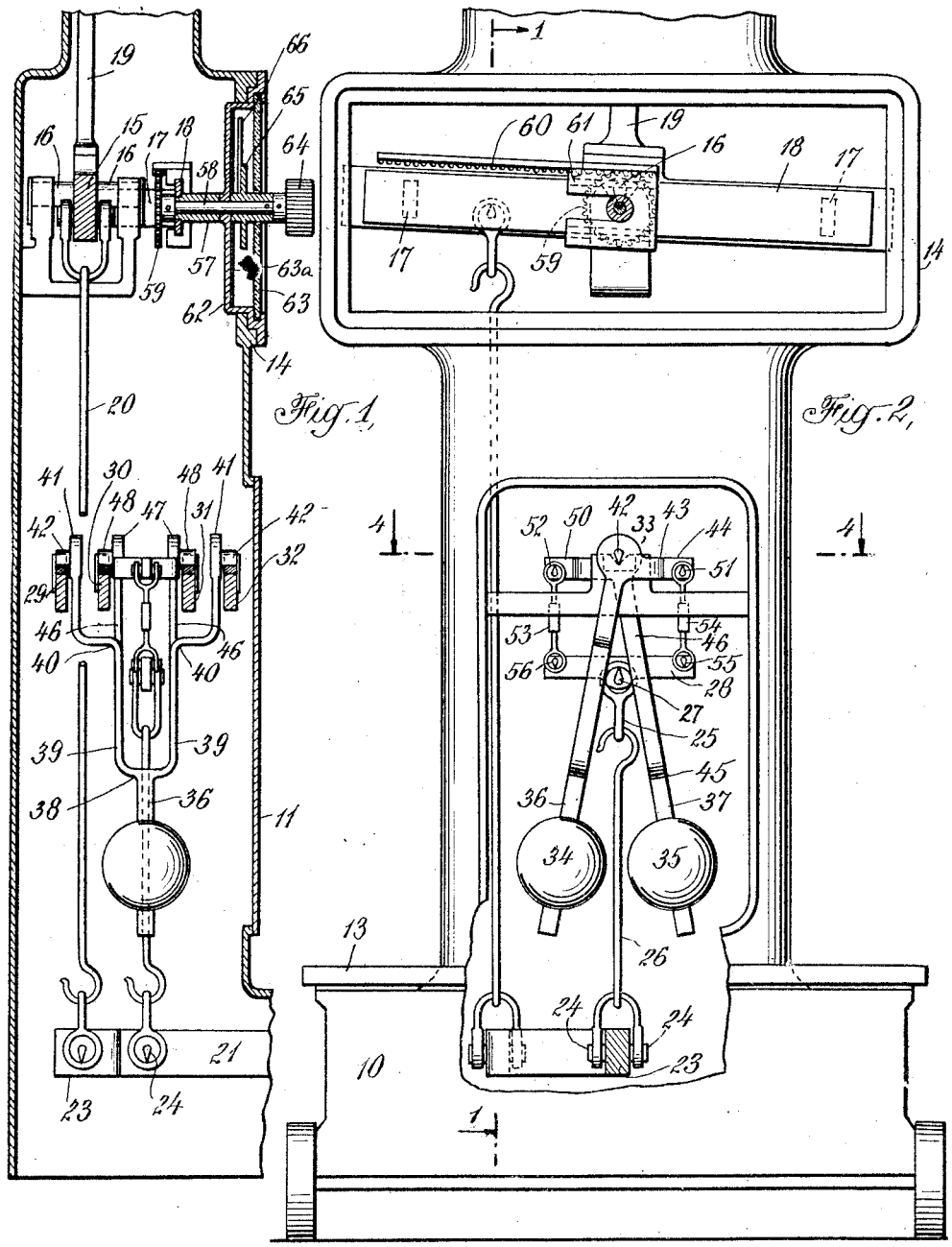

May 3, 1927.
L. A. OSGOOD
1,626,961
PORTABLE SCALE
Filed March 16, 1920   2 Sheets-Sheet 2
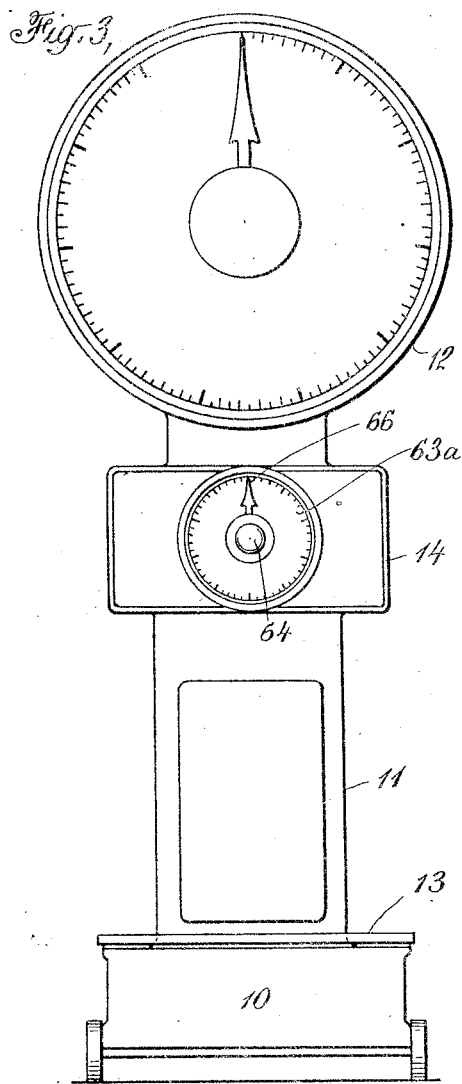
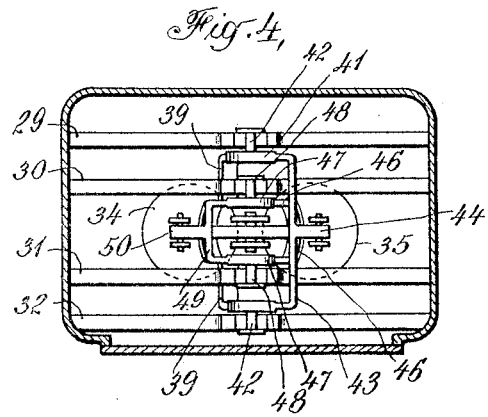
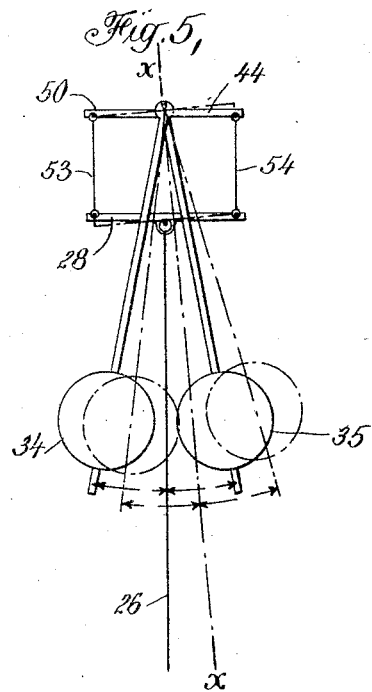
Inventor
Louis A. Osgood
By his Attorneys
Kerr Page Cooper & Hayward Patented May 3, 1927.

1,626,961

UNITED STATES PATENT OFFICE.

LOUIS ASHLEY OSGOOD, OF DAYTON, OHIO, ASSIGNOR, BY MESNE ASSIGNMENTS, TO INTERNATIONAL SCALE COMPANY, OF DAYTON, OHIO, A CORPORATION OF ILLINOIS.

PORTABLE SCALE.

Application filed March 16, 1920. Serial No. 366,223.

This invention relates to improvements in the scale shown and described in my copending application Serial No. 105,903, filed June 26, 1916.

In scales of this type known as portable dial scales, one of the troublesome features has been that the scales change their balance when moved about upon an uneven surface, for example, upon a factory floor.

One of the objects of the present invention resides in the disposition of the parts and in particular the counter-balancing pendulums, in such a manner that changes in balance are minimized if not entirely obviated when the scale is moved upon an uneven supporting surface.

Other objects of the present invention reside in the provision of a novel tare poise setting device which is adapted to indicate the amount of tare upon a visible dial and in which the tare poise is set by turning a tare knob. The construction of the tare device is such that all parts are within the casing of the scale with the exception of the tare knob. The casing protects the parts against tampering or injury.

Other objects of the invention reside in the provision of a device in which the tare setting may be made in a more accurate manner than heretofore and in which the tare weight may be readily read.

Other objects and advantages will be pointed out in the accompanying specification and shown in the drawings, in which:

Fig. 1 shows a sectional view of the scale, the section being taken on line 1—1 of Fig. 2.

Fig. 2 shows a front view with the cover plate over the tare devices removed.

Fig. 3 shows a front view of the complete scale with the cover plate in place.

Fig. 4 shows a detail central section taken on line 4—4 of Fig. 1.

Fig. 5 is a diagrammatic view showing the action of the pendulums when the scale is tilted.

The scale housing includes a base or platform housing 10, a pedestal 11, and a dial housing 12. Within the base is a suitable base lever system for supporting the platform 13. The pedestal housing 11 is enlarged as shown at 14, to provide space for the main scale beam 15, which is provided with knife edges 16 resting in bearings carried by a bracket best shown in Fig. 1. Attached to the main scale beam by brackets 17 is a tare beam 18 of usual construction but disposed within the housing 14. The scale beam carries the usual vertical arm 19 which actuates the weight-indicating devices and is connected to the base lever system by the usual system of knife edges, trig loops and steel-yard 20.

In order to provide a suitable connection for both steel-yard 20 and the counterbalancing means, I preferably branch the weight moved member or nose iron 21 as shown at 22 and 23 in Figs. 1 and 2. Branch 23 carries knife edges 24. A short connecting element or steel-yard 26 carries a lower trig loop that co-operates with these knife edges and at its upper end connects with a trig loop 25 supported by knife edges 27. These knife edges are carried by an evener bar 28.

Disposed horizontally across the pedestal 11 and supported thereby are four plates or bearing supporting members 29, 30, 31 and 32. These members carry V-bearings 33 (see Figs. 2 and 4). The bearing lines of all these bearings align and this bearing line also coincides with the center line of the short steel-yard or connecting element 26 (see Fig. 2).

*Pendulum counterbalance.*—A double pendulum arrangement is used for counterbalancing. The pendulum balls or weights are shown at 34 and 35.

The pendulum ball-carrying arms are shown at 36 and 37. This arm 36 is bifurcated at 38 into two arms 39 which are spaced apart so as to clear the short steel-yard 26 and the trig loop 25 and evener bar 28. The arms 39 are forked to a greater extent at 40 so as to pass outside of the bearing supporting members 30 and 31. Each arm 39 is provided with a hub 41 carrying a knife edge 42 which rests in the bearing carried by bearing supporting members 29 and 32 (see Figs. 1, 2 and 4). Beyond the hubs 41, arms 39 are united by a member 43 which is provided with an arm 44 in vertical alignment with the evener bar 28.

The arm 37 which carries pendulum ball 35 is similarly bifurcated as shown at 45 to clear the steel-yard 26, trig loop 25, and evener bar 28 and these bifurcated arms 46 are provided with hubs 47 carrying knife edges 48 which rest in the bearings supported by members 30 and 31. The arms 46 are similarly joined beyond the hubs by a part 49 which has an outwardly extending arm 50 in alignment with arm 44 and with evener bar 28.

The aligned arms 44 and 50 which will hereafter be termed crank arms, are provided with pairs of knife edges 51 and 52. Links 53 and 54 co-operate with these knife edges and with similar pairs of knife edges 55 and 56 carried by the evener bar 28.

The arrangement described provides a means for maintaining the same counterbalancing action and the same zero balance when the scale is tipped slightly. Fig. 5 shows the action that takes place when the scale is tipped. It will be observed that the distances of the pendulum balls (as shown by solid lines) from the steel-yard 26 is the same as the distance of the balls from dotted line X—X, which is the true vertical line when the scale is tipped. After the balls are in the displaced (dotted line) position they will move upwardly through equal arcs upon the application of a load to the platform. The arcs are the same as the arcs traversed by the balls with the scale level.

*Tare Devices.*—Fixed in tare beam 18 is a hollow stud 57. The center line of the stud is in alignment with knife edge pivot 16 as shown in Fig. 2. Within the stud is a shaft 58 which has at its inner end a pinion 59 meshing with a rack 60. Rack 60 is fastened to a tare poise 61 which poise is slidable upon the tare beam in the usual manner. Shaft 58 projects through an opening in a pedestal cover plate 62 and through a similar opening in a dial glass 63 and carries at its end a knob 64 which will hereafter be termed a tare knob. Cover plate 62 has fixed thereto a graduated dial 63$^a$ and shaft 58 has pinned thereto a member 65 carrying a pointer 66 adapted to sweep over the dial. The operation will be readily understood. The tare weight is compensated for by turning the tare knob and sliding poise 61 to the right on the tare beam. When the scale comes to balance as shown by the main weight indicator 67, the operator reads the tare weight indicated by the pointer 66 on graduated dial 63$^a$. The dial construction provides a greater space for graduations than the tare beam itself would provide and the setting of the poise can be made more accurate and in less time than could be done by a hand setting of the poise.

Furthermore, the tare devices are all enclosed and are not subject to tampering or injury. It will be understood that suitable clearance should be provided around the shaft 58 at the points where this shaft passes the cover plate and glass. These features are well known to those skilled in the art and need not be set forth in further detail herein.

The pendulum mounting herein described has other advantages over former constructions in which the pendulums are mounted high up in the dial housing or pedestal. In the present construction the pendulums are mounted low down in the frame of the scale and are therefore less subject to the effects of changes of level than with prior constructions having the pendulum mounting disposed at a considerable distance from the floor.

While the improved pendulum mounting is particularly advantageous with portable scales, it is also advantageous with stationary scales which in some cases are mounted upon weak floors. With these installations difficulty has been experienced with changes in balance when heavy trucks are moved in the vicinity of the scales. The present construction prevents changes in balance under these conditions.

What I claim as my invention is particularly set forth in the appended claims.

I claim:—

1. In a scale having a weight moved element and a pendulum counterbalancing means adapted to be variably displaced thereby in accordance with varying loads on the scale, in combination a plurality of counterbalancing pendulums, an aligned pivot mounting for all said pendulums, oppositely extending crank arms adapted to actuate said pendulums, an evener bar disposed below said crank arms, means connecting said crank arms and said evener bar and connections between said evener bar and said weight moved member.

2. In a scale having a weight moved element and a pendulum counterbalancing means adapted to be variably displaced thereby in accordance with varying loads on the scale in combination, a plurality of counterbalancing pendulums, a plurality of carrying arms for said pendulums, said arms being bifurcated, an aligned pivot mounting for said pendulums, members connecting said carrying arms and having oppositely extending crank arms for actuating the pendulums, knife edges carried by said crank arms, an evener bar disposed below the crank arms carrying knife edges, links connecting the knife edges of the evener bar to the knife edges of the crank arm and operating connections from said evener bar to said weight moved element.

3. In a scale in combination, a pair of counterbalancing pendulums, an aligned pivot mounting therefor, means for supporting said pendulums upon said aligned pivots, oppositely extending crank arms associated with said means and adapted to swing the pendulums in opposite directions, an evener bar disposed below said arms, means for connecting said evener bar with said crank arms, and a connection to a moving part of the scale from said evener bar, said connection being in vertical alignment with the line of the pivots which support the pendulum.

4. In a scale in combination, a weight moved part, a plurality of pairs of bearing supporting members, aligned bearings carried thereby, a pendulum counterbalance supported by one pair of said bearings and having bifurcated pendulum ball carrying arms and a crank arm, a second pendulum counterbalance carried by the other pair of said bearings and having bifurcated arms adapted to clear said first mentioned arms and a crank arm oppositely disposed to said first mentioned arms and means for operating said pendulums in unison and compensating for changes in scale level, said means comprising a connection to the weight moved part, an evener bar connected to said connection, and means connecting the ends of the evener bar with said crank arms.

5. In a scale in combination, a plurality of bearing supporting members, a plurality of aligned bearings carried thereby, a plurality of pendulum counterbalancing means supported by said bearings, crank arms for actuating said pendulums extending oppositely from said bearing line, depending links connected to said crank arms, an evener bar connected to said links, and a depending connection from said evener bar to a weight moved part, the aforesaid pendulum counterbalancing means including bifurcated pendulum weight carrying arms adapted to clear each other and the evener bar and associated parts.

6. A weighing scale including in combination, a base, an upper indicator housing, an intermediate housing below the indicator housing, a lever within the base, an automatic counterbalancing system comprising a double pendulum structure operatively connected to the lever and to each other to cooperate for out of level conditions of the scale, said system being disposed substantially in the lower part of the lower intermediate housing to afford minimum displacement of the same upon out of level displacement of the scale said double pendulums both having a common and coincident pivotal axis, and operating connections to the indicating devices in said indicator housing.

7. In a scale in combination, a main scale beam, an automatic counterbalance thereafter adapted to cause said beam to assume varying positions of displacement in accordance with varying loads thereon, a tare beam connected to the main beam, a poise slidable thereon, a rack carried by said poise, a pinion meshing with said rack, means including a rotatable shaft for rotating the pinion and shifting the position of the tare poise, and a graduated dial and a pointer carried by said shaft adapted to indicate the displacement of the poise and the amount of the tare.

8. In a scale in combination, a housing, a main scale beam fulcrumed therein, an automatic counterbalance therefor, said beam assuming variable positions in accordance with the variable loading thereof, a tare beam carried by said scale beam and within the housing, a tare poise slidable upon said beam, a rack carried by said poise, a pinion meshing therewith, and means for displacing the position of the poise from without the housing, said means including a rotatable shaft adapted to rotate the aforesaid pinion.

9. In a scale in combination, a housing, a main scale beam fulcrumed therein, a tare beam carried by said scale beam and within said housing, a tare poise slidable upon said tare beam, a rack carried by said poise, a pinion meshing therewith, and means for rotating the pinion and displacing the poise from without the housing, said means including a rotatable shaft having its axis concentric with the fulcrum line of the main scale beam and adapted to rotate the aforesaid pinion.

10. In a scale in combination, a fulcrumed scale beam structure, a tare beam associated therewith, a poise slidable thereon, a rack connected to said poise, a pinion meshing with said rack, means including a rotatable shaft having its axis concentric with the fulcrum line for rotating the pinion and for shifting the position of the tare poise, and a graduated dial and a pointer operatively connected to said shaft adapted to indicate the displacement of the poise and the amount of the tare.

11. In a scale having a supporting structure, a weight moved element and a pendulum counterbalancing means adapted to be variably displaced thereby in accordance with varying loads on the scale, in combination, a plurality of counterbalancing pendulums, means for compensating the pendulum action upon variations in level of the said supporting structure, said means comprising an aligned knife edge pivot mounting for all said pendulums, means including oppositely and outwardly extending arm portions for actuating the said pendulums, an evener device disposed below said last mentioned means, means connecting said evener device and pendulum actuating means, and operating connections between said evener device and said weight moved element.

12. A weighing scale including an indicator housing, an indicator driving device therein, a scale beam below said housing, a housing below said beam, a base lever, an automatic pendulum system within the housing below the scale beam, said system including a pair of pendulums operatively connected to each other to afford compensation for changes in level of the scale and disposed relatively low in said housing to afford minimum displacement of the same upon out of level conditions of the scale, and operating connections connecting the pendulum system, the lever, the scale beam and indicator driving device to effect conjoint operation upon the application of a load to the lever.

In testimony whereof I hereunto affix my signature.

LOUIS ASHLEY OSGOOD.